(12) United States Patent
Leposa

(10) Patent No.: US 8,916,181 B1
(45) Date of Patent: Dec. 23, 2014

(54) GLITTER AEROSOL COATING COMPOSITION

(75) Inventor: Christina M. Leposa, Strongsville, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 365 days.

(21) Appl. No.: 13/267,204

(22) Filed: Oct. 6, 2011

Related U.S. Application Data

(60) Provisional application No. 61/391,237, filed on Oct. 8, 2010.

(51) Int. Cl.
| | |
|---|---|
| C08F 220/06 | (2006.01) |
| C08F 210/10 | (2006.01) |
| C08F 2/06 | (2006.01) |
| B01J 8/00 | (2006.01) |
| B65D 83/14 | (2006.01) |
| B05B 9/04 | (2006.01) |
| C08J 3/09 | (2006.01) |
| G01F 11/00 | (2006.01) |
| C08G 18/34 | (2006.01) |

(52) U.S. Cl.
USPC ........ 424/402; 424/407; 222/321.8; 239/302; 239/360; 239/361; 516/99; 524/500; 524/508

(58) Field of Classification Search
USPC .......... 524/500, 508; 424/323, 402, 403, 407; 516/99; 222/321.8
See application file for complete search history.

(56) References Cited

U.S. PATENT DOCUMENTS

| | | | | |
|---|---|---|---|---|
| 3,488,308 A | * | 1/1970 | Colbert et al. | 524/259 |
| 3,764,067 A | * | 10/1973 | Coffey et al. | 239/1 |
| 3,819,119 A | * | 6/1974 | Coffey et al. | 239/337 |
| 6,649,686 B1 | * | 11/2003 | Peters | 524/503 |

OTHER PUBLICATIONS

Calumet, Product Synergel VM&P, MSDS Document, Jul. 29, 2010, Karns City, PA.

* cited by examiner

*Primary Examiner* — Jane C Oswecki
(74) *Attorney, Agent, or Firm* — Eryn Ace Fuhrer; Robert E. McDonald; Deron A. Cook

(57) ABSTRACT

An aerosol glitter composition for achieving the "sugar" glitter effect comprises a solvent, binder, square polyester glitter, optionally a rheology modifier, and propellant.

13 Claims, 1 Drawing Sheet

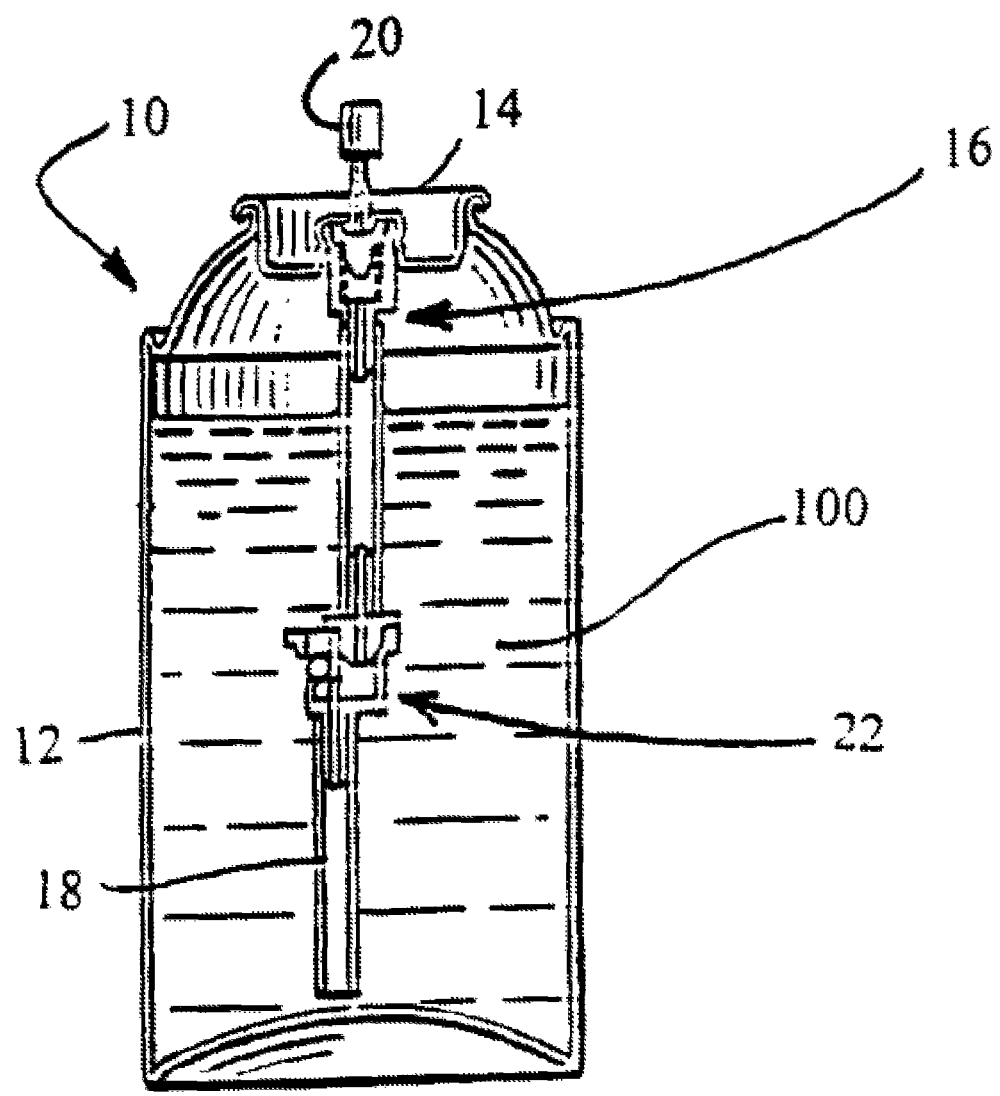

GLITTER AEROSOL COATING COMPOSITION

CROSS REFERENCE TO RELATED APPLICATION

This application claims priority from Provisional Application Ser. No. 61/391,237 filed Oct. 8, 2010.

BACKGROUND OF THE INVENTION

"Sugar" glitter is a popular effect in the craft market. Typically the effect is achieved by applying dry glitter over glue to adhere the glitter to a substrate. Other products which claim to provide a sugar glitter effect are gels that must be brush applied. The present invention provides an aerosol glitter product capable of providing the sugar glitter effect.

BRIEF DESCRIPTION OF THE DRAWINGS

FIG. 1 shows a schematic view of an aerosol container charged with an aerosol composition embodied in accordance with the present invention.

DETAILED DESCRIPTION OF THE INVENTION

The present invention relates to an aerosol glitter product. The aerosol product may be applied to a substrate to create a sugar glitter effect.

The aerosol product of the present invention comprises a mixture of solvent, binder polymer, glitter jewels, optionally a rheology modifier, and propellant in an aerosol container.

The solvent of the present invention comprises a volatile organic solvent. Volatile organic solvents that may be used in the solvent system include alcohols, such as methanol, ethanol, isopropanol, 2-butoxy ethanol, and n-butyl alcohol; ketones, such as acetone, methyl ethyl ketone, methyl propyl ketone, and methyl isobutyl ketone; propylene and ethylene glycol ethers and acetates; aliphatic and aromatic hydrocarbons and naphthas; petroleum and wood distillates; turpentine; mineral spirits; pine oil, and the like. Mixtures of the foregoing solvents may also be used. In one useful embodiment, the solvent is a aliphatic hydrocarbon, for example hexane. The aerosol glitter composition of the present invention comprises about 30% to about 50% by weight solvent, for example about 40%.

In one useful embodiment, the binder polymer is an acrylic polymer. The acrylic portion is formed from monomers comprising at least one acrylic monomer and can be a homopolymer or a copolymer. Preferably, the acrylic portion is a copolymer formed from at least one acrylic monomer and a vinyl aromatic hydrocarbon, such as styrene, a methyl styrene or other lower alkyl styrene, chlorostyrene, vinyl toluene, vinyl naphthalene, or divinyl benzene. More preferably, the acrylic portion is formed from at least one acrylic monomer and vinyl toluene. Suitable acrylic monomers include any compounds having acrylic functionality, such as alkyl(meth)acrylates, acrylic acids, as well as aromatic derivatives of (meth)acrylic acid, acrylamides and acrylonitrile. Typically, the alkyl(meth)acrylate monomers (commonly referred to as "alkyl esters of (meth)acrylic acid") will have an alkyl ester portion containing from 1 to 12, preferably about 1 to 5, carbon atoms per molecule. Suitable acrylic monomers include, for example, methyl(meth)acrylate, ethyl(meth)acrylate, butyl(meth)acrylate, propyl(meth)acrylate, 2-ethyl hexyl(meth)acrylate, cyclohexyl(meth)acrylate, decyl(meth)acrylate, isodecyl(meth)acrylate, benzyl(meth)acrylate, isobornyl(meth)acrylate, neopentyl(meth)acrylate, 1-adamantyl methacrylate and various reaction products such as butyl, phenyl, and cresyl glycidyl ethers reacted with (meth)acrylic acid, hydroxyl alkyl(meth)acrylates, such as hydroxyethyl and hydroxypropyl(meth)acrylates, amino(meth)acrylates, as well as acrylic acids such as (meth)acrylic acid, ethacrylic acid, alpha-chloroacrylic acid, alpha-cyanoacrylic acid, crotonic acid, beta-acryloxy propionic acid, and beta-styryl acrylic acid. In one useful embodiment, the acrylic polymer is an isobutyl methacrylate polymer.

Various acrylic binder polymers are commercially available and may be useful in the present invention, for example, PARALOID B-67MT, which is a isobutyl methacrylate polymer in a 45% solids solution in mineral spirits. The aerosol composition may comprise about 10% to about 20% by weight of such a binder polymer solution, for example about 16%.

The aerosol glitter composition of the present invention may further optionally comprise a rheology modifier. In one useful embodiment, the rheology modifier is a gel material, for example, a hydrocarbon gel. The gel material may be mixed with or dissolved in a hydrocarbon solvent. A variety of rheology modifiers are commercially available. One useful example is SYNERGEL® VM&P gel. The aerosol glitter composition comprises about 6% by weight of a rheology modifier.

The aerosol glitter composition of the present invention further comprises glitter jewels. In one embodiment, the composition comprises square shaped glitter jewels. Square shaped glitter jewels are commercially available in a variety of sizes and colors. The present invention may comprise a mixture of glitter jewels of one or more sizes. In one embodiment of the invention, the aerosol glitter composition of the present invention comprises glitter jewels selected from 0.004 inch×0.004 inch jewels, 0.006 inch×0.006 inch jewels, 0.008 inch×0.008 inch jewels, or mixtures thereof. The aerosol glitter composition of the present invention may comprise up to about 8% by weight glitter jewels, for example, about 2% to about 8% by weight glitter jewels. In one useful embodiment, the aerosol glitter composition comprises a mixture of 0.004 inch×0.004 inch and 0.006 inch×0.006 inch glitter jewels.

In addition to containing different sizes of glitter jewels, the present invention may also comprise different colored glitter jewels. In one useful embodiment, the aerosol glitter product comprises at least 2 different colored glitter jewels, for example 2, 3, 4, or 5 colors.

The aerosol composition of the present invention is formed by combining, with an air mixer, the binder, solvent, rheology modifier, and glitter jewels and filling it into an aerosol container as described herein. The composition is placed in a container and then the combination is aerosolized with the propellant.

The propellant is a liquefiable gas having a vapor pressure sufficient to propel the aerosol paint composition from the container. In one useful embodiment, the propellant is selected from the group consisting of ethers, such as dimethyl ether (DME) and diethyl ether; C1-C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing.

The amount of the propellant present in the aerosol composition is typically at least 10 weight percent and preferably from about 20 to about 40 weight percent, more preferably from about 25 to about 35 weight percent of the total weight of the aerosol composition.

In one useful embodiment, the solvent-borne aerosol composition of the present invention is made in a batch process at or below a temperature of 70° F. The components of the aerosol composition, except the propellant are mixed with an air mixer. The resulting composition is filtered to remove any large agglomerations. The composition is then added to a container, such as container 10 shown in FIG. 1, and then the propellant is added to form the aerosol composition.

Referring now to FIG. 1, the container 10 comprises a can 12, to which a valve cup 14 is secured. A valve assembly 16 with a dip tube 18 connected thereto is secured to the valve cup 14. The dip tube 18 extends into the interior of the can 12 and is in contact with the aerosol paint composition, which is designated by the numeral 100. The can 12 may be composed of aluminum or more preferably tin plated steel. The valve cup 14 may be sealed to the can 12 and the propellant charged through the valve assembly 16, or the can 12 may be charged with the propellant under the valve cup 14, and then the valve cup 14 sealed to the can 12. An actuator 20 is then connected to the valve assembly 16.

Various valves, dip tubes and actuators may be used to spray the aerosol paint composition. Preferably, the dip tube 18 is a standard dip tube having a diameter of about 0.147 inches. The valve assembly 16 may be either a "female" aerosol valve or a "male" aerosol valve. Examples of "female" aerosol valves that may be used in the present invention are disclosed in U.S. Pat. Nos. 3,033,473; 3,061,203; 3,074,601; 3,209,960; and 5,027,985. Examples of "male" aerosol valves that may be used in the present invention are disclosed in U.S. Pat. Nos. 2,631,814, and 4,572,406. Preferably, the valve assembly 16 is a "female" valve with a spray controller 22 having a construction as disclosed in U.S. Pat. No. 4,572,406, which is hereby incorporated by reference. The spray controller 22 permits the aerosol paint composition 100 to be dispensed when the container 10 is inverted.

The aerosol product of the present invention is acid free and may be applied to multiple substrates, including but not limited to Styrofoam, wood, metal, wicker, cloth, glass and plastics.

Once applied to a substrate, the aerosol glitter composition of the present invention may be further coated with UV archival varnishes, such as KRYLON® UV Archival gloss varnish, KRYLON® KAMAR® varnish, or KRYLON Glitter Blast Clear Sealer. In another embodiment, the aerosol glitter composition of the present invention may be coated with a clearcoat composition comprising about 20% to about 40% by weight acrylic resins in solution, such as PARALOID™ F-10 and PARALOID™ B67MT acrylic resin solutions available from Dow and mixtures thereof, about 12% by weight lacolene solvent, about 15% by weight isopropyl alcohol, about 8% by weight hexane, and about 25% by weight propellant, such as NP70 propellant.

The invention will be better understood by reference to the following examples:

Example 1

An aerosol glitter composition may be formed by combining the following components in a mixing vessel in the noted amounts, where parts are parts by weight.

| | |
|---|---|
| Binder[1] | 16 parts |
| Solvent[2] | 40 parts |
| 0.006 × 0.006 square polyester glitter[3] | 2 parts |
| 0.006 × 0.006 square polyester glitter[4] | 2 parts |

-continued

| | |
|---|---|
| 0.004 × 0.004 square polyester glitters[5] | 4 parts |
| Rheology modifier[6] | 6 parts |

[1]Paraloid ™ B-67 MT (45% solids in mineral spirits) from Dow
[2]Hexane
[3]Penny Copper color from Meadowbrook Glitter
[4]Dark Gold color from Meadowbrook Glitter
[5]Gold Orange color from Meadowbrook Glitter
[6]Synergel ® VM&P The above composition may be charged to an aerosol container composed of tin-plated steel and pressurized with 30 parts by weight of A-108 propane hydrocarbon propellant to form the aerosol composition.

A second aerosol glitter composition may be formed by combining the following components in a mixing vessel in the noted amounts, where parts are parts by weight.

| | |
|---|---|
| Paraloid B-67 MT | 17.02 parts |
| Hexane | 42.55 parts |
| 0.006 × 0.006 Chartreuse square polyester glitter from Meadowbrook Glitter | 5.32 parts |
| 0.004 × 0.004 Dark Gold square polyester glitter from Meadowbrook Glitter | 1.06 parts |
| 0.004 × 0.004 Emerald Green square polyester glitter from Meadowbrook Glitter | 2.13 parts |

The above composition may be charged to an aerosol container composed of tin-plated steel and pressurized with 31.91 parts by weight of A-108 propane hydrocarbon propellant to form the aerosol composition.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, or in any other way that is inconsistent with the extent to which the progress in the art has been advanced by the invention.

What is claimed is:

1. An aerosol glitter product comprising:
   (a) a container comprising a can, a valve cup with a valve assembly, a dip tube and an actuator; and
   (b) an aerosol glitter composition disposed within said container, said aerosol glitter composition comprising:
      (i) an acrylic binder;
      (ii) solvent;
      (iii) a hydrocarbon gel rheology modifier;
      (iv) glitter jewels; and
      (v) a propellant.

2. The aerosol glitter product of claim 1, wherein the acrylic binder is an isobutyl methacrylic polymer.

3. The aerosol glitter product of claim 1, wherein the solvent is hexane.

4. The aerosol glitter product of claim 1, wherein the glitter jewels are square.

5. The aerosol glitter product of claim 4, wherein the glitter jewels comprise 0.006 inch×0.006 inch glitter jewels.

6. The aerosol glitter product of claim 4, wherein the glitter jewels comprise 0.004 inch×0.004 inch glitter jewels.

7. The aerosol glitter product of claim 4, wherein the glitter jewels comprise a mixture of 0.004 inch×0.004 inch glitter jewels and 0.006 inch×0.006 inch glitter jewels.

8. The aerosol glitter product of claim 1, wherein the aerosol glitter composition comprises 2%-8% by weight glitter jewels.

9. The aerosol glitter product of claim 1, wherein the aerosol glitter composition comprises at least two different colors of glitter jewels.

10. The aerosol glitter product of claim 1, wherein the propellant is A-108 propane hydrocarbon propellant.

11. The aerosol glitter product of claim 1, wherein the aerosol glitter composition comprises about 30% to about 50% by weight solvent.

12. The aerosol glitter product of claim 1, wherein the aerosol glitter composition comprises about 10% to about 20% by weight acrylic binder.

13. The aerosol glitter product of claim 1, wherein the aerosol glitter composition comprises about 6% by weight hydrocarbon gel rheology modifier.

\* \* \* \* \*